(12) United States Patent
Roberts et al.

(10) Patent No.: US 8,195,253 B2
(45) Date of Patent: *Jun. 5, 2012

(54) WIRELESS PORTABLE RADIO VEHICLE COMMUNICATION SYSTEM

(75) Inventors: James Roberts, Austin, TX (US); David Fettig, Fremont, CA (US)

(73) Assignee: Pinnacle Peak Holding Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/185,448

(22) Filed: Jul. 18, 2011

(65) Prior Publication Data

US 2011/0275401 A1    Nov. 10, 2011

Related U.S. Application Data

(63) Continuation of application No. 11/899,354, filed on Sep. 4, 2007, now Pat. No. 8,010,171.

(60) Provisional application No. 60/841,744, filed on Sep. 1, 2006.

(51) Int. Cl.
*H04B 1/38* (2006.01)
*H04M 1/00* (2006.01)

(52) U.S. Cl. ............... 455/575.2; 455/11.1; 455/575.1; 455/575.9; 455/569.1; 340/928

(58) Field of Classification Search ............ 455/575.2, 455/11.1, 575.1, 575.9, 569.1; 340/928
See application file for complete search history.

(56) References Cited

U.S. PATENT DOCUMENTS

| | | | |
|---|---|---|---|
| 3,703,714 A * | 11/1972 | Andrews | 180/289 |
| 5,144,678 A | 9/1992 | Lenz | |
| 5,163,158 A * | 11/1992 | Tendler et al. | 455/11.1 |
| 5,418,537 A | 5/1995 | Bird | |
| 5,453,585 A | 9/1995 | Lenz et al. | |
| 5,464,413 A | 11/1995 | Siska, Jr. et al. | |
| 5,492,110 A | 2/1996 | Lenz et al. | |
| 5,590,209 A | 12/1996 | Pratt et al. | |
| 5,771,303 A | 6/1998 | Mazzarella et al. | |
| 5,771,438 A | 6/1998 | Palermo et al. | |
| 5,777,580 A | 7/1998 | Janky et al. | |
| 5,781,121 A | 7/1998 | Kawamure | |
| 5,790,947 A | 8/1998 | Dieringer | |
| 5,881,101 A * | 3/1999 | Furman et al. | 375/217 |
| 5,912,925 A | 6/1999 | Palermo et al. | |
| 5,982,764 A | 11/1999 | Palermo et al. | |
| 6,028,506 A | 2/2000 | Xiao | |
| 6,230,029 B1 | 5/2001 | Hahn et al. | |
| 6,311,052 B1 | 10/2001 | Lenz | |
| 6,420,975 B1 | 7/2002 | DeLine et al. | |
| D464,953 S | 10/2002 | Lenz et al. | |
| D464,954 S | 10/2002 | Lenz et al. | |
| D464,955 S | 10/2002 | Lenz et al. | |

(Continued)

OTHER PUBLICATIONS

"Wireless Communication Tool", 10 Police Fleet Manager, Winter 2003 (1 pg.).

(Continued)

*Primary Examiner* — Marceau Milord
(74) *Attorney, Agent, or Firm* — Faegre Baker Daniels LLP

(57) ABSTRACT

A communications system for a vehicle user is provided. The system comprises a portable receiver which the vehicle user can easily carry on his or her person. The portable receiver is capable of receiving coded transmissions from a vehicle-mounted transmitter which is capable of activating a function in a portable transceiver.

16 Claims, 7 Drawing Sheets

U.S. PATENT DOCUMENTS

| | | | |
|---|---|---|---|
| 6,459,882 B1 | 10/2002 | Palermo et al. | |
| 6,718,187 B1 | 4/2004 | Takagi et al. | |
| 6,745,014 B1 | 6/2004 | Seibert et al. | |
| 6,763,226 B1 | 7/2004 | McZeal | |
| 6,783,040 B2 | 8/2004 | Batchelor | |
| 6,885,285 B2 | 4/2005 | Losey | |
| 6,904,147 B2 | 6/2005 | Lenz et al. | |
| 6,950,635 B1 | 9/2005 | Miyamaru et al. | |
| 7,010,275 B2 | 3/2006 | Davies | |
| 7,058,384 B2 | 6/2006 | Davies | |
| 7,062,301 B1 | 6/2006 | Dieringer | |
| 7,110,800 B2 | 9/2006 | Nagayasu et al. | |
| 7,203,525 B2 | 4/2007 | Dieringer | |
| 7,269,416 B2 * | 9/2007 | Guthrie et al. | 455/420 |
| 7,295,100 B2 * | 11/2007 | Denison et al. | 340/5.73 |
| 7,298,246 B1 * | 11/2007 | Schmitt | 340/426.1 |
| 7,310,043 B2 * | 12/2007 | Mamaloukas | 340/5.61 |
| 7,414,519 B2 | 8/2008 | Onishi et al. | |
| 7,483,682 B2 * | 1/2009 | Williams | 455/180.1 |
| 7,551,940 B2 | 6/2009 | Paulson et al. | |
| 7,683,758 B2 * | 3/2010 | Denison et al. | 340/5.73 |
| 7,818,036 B2 * | 10/2010 | Lair et al. | 455/575.2 |
| 7,915,997 B2 * | 3/2011 | King et al. | 340/3.21 |
| 8,010,171 B2 * | 8/2011 | Fettig et al. | 455/575.2 |
| 2004/0002354 A1 * | 1/2004 | Nagano | 455/550.1 |
| 2005/0258980 A1 | 11/2005 | Conover | |
| 2006/0165243 A1 | 7/2006 | Lee | |
| 2007/0184881 A1 | 8/2007 | Wahl et al. | |
| 2008/0014865 A1 | 1/2008 | Roberts et al. | |
| 2009/0247245 A1 | 10/2009 | Strawn et al. | |

OTHER PUBLICATIONS

Gawel, Richard, "Bluetooth Dons The Blues", Electronic Design, The Authority on Emerging Technologies for Design Solutions Retrieved, Feb. 16, 2004, also available at www.elecdesign.com/articles/print.cfm?ArticleID=7339 (1 pg.).

Anonymous, "Product Briefs", MRT, Mar. 1, 2004, also available at mrtmag.com/mag/radio_product_briefs/index.html, (2 pgs.).

"PVP Communications Wireless Motor Kit", Police Magazine, Feb. 2004, also available at policmag.com/t_prods.cfm. (1 pg.).

"Eliminate Motorcycle-to-Officer Cable Connection Forever!", Hit The Streets: Vehicles & Accessories, LEPN, Jul./Aug. 2004, also available at www.officer.com (1 pg.).

Anonymous, Law Enforcement Product News, LEPN, Sep./Oct. 2006, also available at www.officer.com (2 pgs.).

Setcom, "Police Motorcycle Communications," Oct. 2005 (8 pgs.).

"Motor-One Wireless Motor Kit", Law Officer Magazine, Jun. 2006 (1 pg.).

"Motor-One Wireless Motor Kit ", Law Officer Magazine, Sep. 2006 (1 pg.).

"Motor-One Wireless Motor Kit", Law Enforcement Technology, Jun. 2006 (2 pgs.).

Roberts, Jim, "Improving safety Through Communications", The Mounted Officer, Fall 2005, p. 5-6, vol. 76, No. 1 (4 pgs.).

PVP Wireless Brochure (2pgs.).

PVP Communications "Press Releases", Retrieved Sep. 13, 2005 (5 pgs.).

"Wireless Helmet Communications ", Law Enforcement Technology, Jun. 2006 (1 pg.).

"Step Into the Next Generation", Law Officer Magazine, Jan.-Feb. 2006 (1 pg.).

"Motor-One Wireless Motor Kit", Law Officer Magazine, Mar. 2006 (1 pg.).

"Step Into the Next Generation", Law Officer Magazine, Nov.-Dec. 2005 (1 pg.).

"Motor-One Wireless Motor Kit", Law Officer Magazine, Apr./May 2006 (1 pg.).

"Motor-One Wireless Motor Kit", LEPN, Jul.-Aug. 2005, also available at www.officer.com (1 pg.).

"Eliminate Motorcycle-to-Officer Cable Connection Forever!", LEPN, Jul.-Aug. 2004, also available at www.officer.com (1 pg.).

"Motor-One Wireless Motor Kit", LEPN, Mar.-Apr. 2006, also available at www.officer.com (1 pg.).

"Motor-One Wireless Motor Kit", LEPN, May-Jun. 2006, also available at www.officer.com (1 pg.).

PVP Wireless Brochure, May 2005 (2 pgs.).

PVP Communications "Motor-One Wireless Motor Kit", Oct. 2004 (2 pgs.).

"BlueLinks", May 2006, also available at www.blueline.ca (2 pgs.).

"Liberator Wireless System", Law and order, Jun. 2006, (1 pg.).

"Liberator Wireless System", Law and order, Sep. 2006, (1 pg.).

"Wireless Communications for Motorcycle Officers", Law Enforcement Product News, May/Jun. 2006 (2 pgs.).

"Motor officer communications system", Law Enforcement Technology, Jun. 2006, (2 pgs.).

Setcom, "Police Motorcycle Communications Police," Jul. 2006 (1 pg.).

Setcom, "Wireless motorcycle communications systems", The Police Chief Mar. 2006 (1 pg.).

"Setcom Introduces Liberator Wireless System—The Most Recent Advance in Police Motorcycle Communications, setcom's Liberator Wireless System Eliminates the Cable Between Motor Officer and Motorcycle", Press Release Jan. 2006, (2 pgs.).

"Motor-One Wireless Motor Kit", Law Officer Magazine, Jul. 2006 (1 pg.).

"Motor-One Wireless Motor Kit", LEPN, Jul.-Aug. 2006, also available at www.officer.com (1 pg.).

"PVP Communications Wireless Motor Kit", date unknown, (2 pgs.).

* cited by examiner

Fig. 5   RECEIVING UNIT ASSEMBLY 35

TRANSMITTER PCB BOARD LAYOUT

WIRELESS PORTABLE RADIO VEHICLE COMMUNICATION SYSTEM

CROSS-REFERENCE TO RELATED APPLICATIONS

This application is a continuation of U.S. patent application Ser. No. 11/899,354, filed Sep. 4, 2007, which claims priority to U.S. Provisional Patent Application No. 60/841,744, filed Sep. 1, 2006, the entire disclosures of which are incorporated by reference.

TECHNICAL FIELD

This disclosure relates generally to mobile radio systems.

BACKGROUND

Law enforcement motorcycle officers often employ communications systems designed for their needs. In the spectrum of motor vehicle passenger safety, motorcycles are some of the most dangerous vehicles on the road. This danger only increases when a motorcycle rider takes his/her hands off of the handlebars to use a communications device. When you apply this to the job of a law enforcement motorcycle officer, the risk of injury only increases because officers are constantly using communication devices while riding. Enabling riders to keep their hands on the handlebars while riding is an important safety requirement. Moreover, many jurisdictions require by law that motorcyclists keep both hands on the handlebars.

Law enforcement motorcycles have a number of different radio configurations which can include a combination of portable radios and mobile radios. A large number of departments only ride with portable radios. The portable two-way radio is typically worn on the officer's belt and is typically low power with its transceiver having between 3 and 5 watts of power. Portable radios work well in situations where the patrol area is limited, the geographical features of the area are fairly flat, and a good repeater network is installed.

In addition, often a public address (PA) system is installed on the motorcycle. Through a loudspeaker, this system is used to audibly broadcast instructions or information to violators or the general public in a limited area.

Since 1970, there have been a number of offerings in the marketplace to allow motorcycle officers the ability to operate their portable radios without having to take their hands off the handlebars.

These offerings typically include additional equipment on a motorcycle, such as a radio push-to-talk (PTT) button mounted on the handlebar. Pressing the PTT keys the radio and allows the officer to transmit communication. For the PA system, an additional button is also mounted on the handlebar which, when pressed, broadcasts the officer's speech over the PA system.

On the officer, these offerings typically include a boom microphone and speakers that are mounted on/in the helmet.

In between the motorcycle and officer, historically, a wire with a quick release connector has been used to connect the officer-worn equipment to bike-mounted equipment. This wire carries an electrical signal from the handlebar to the portable radio signaling that the radio should transmit.

Others have invented wireless interfaces between communication devices and riders, but the systems of this disclosure are advantageous because they may include some or all of the following features: (a) operate solely off of the motorcycle battery and the portable radio battery. No additional batteries are required. (b) Do not require a rider to pair or sync his on-person equipment with the equipment on the motorcycle. (c) Have no locking connectors which greatly increases rider safety. (d) Have sidetone audio which increases the ease of communication for the rider. (e) Have automatic gain control which allows the operator to control volume peaks. (f) Are easy to install.

SUMMARY

This disclosure relates to a radio accessory system, specifically to a system that is on a vehicle and worn on a person and interfaces radios, speakers, and microphones. The interface between the part of the system that is on the vehicle and the other part that is worn on a person is wireless. The intent of the disclosure is to reduce the distraction of operating communications devices while operating a vehicle thus increasing the safety of a vehicle's users while also enabling the use of communication devices.

BRIEF DESCRIPTION OF THE DRAWINGS

The detailed description of the drawings particularly refers to the accompanying figures in which.

Figure 1:
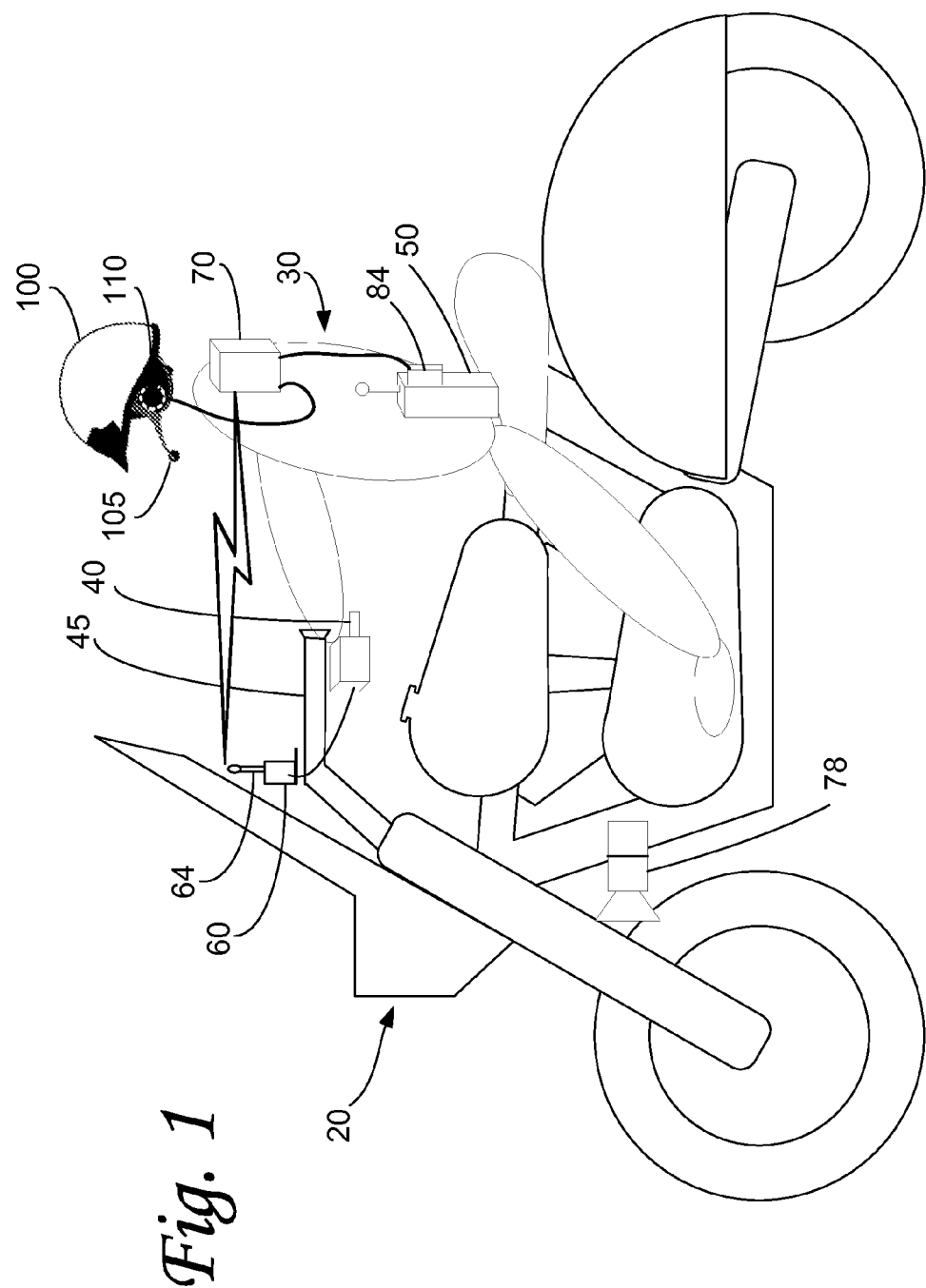
FIG. 1 is a representation of an operator on a vehicle using the system.
Figure 2:
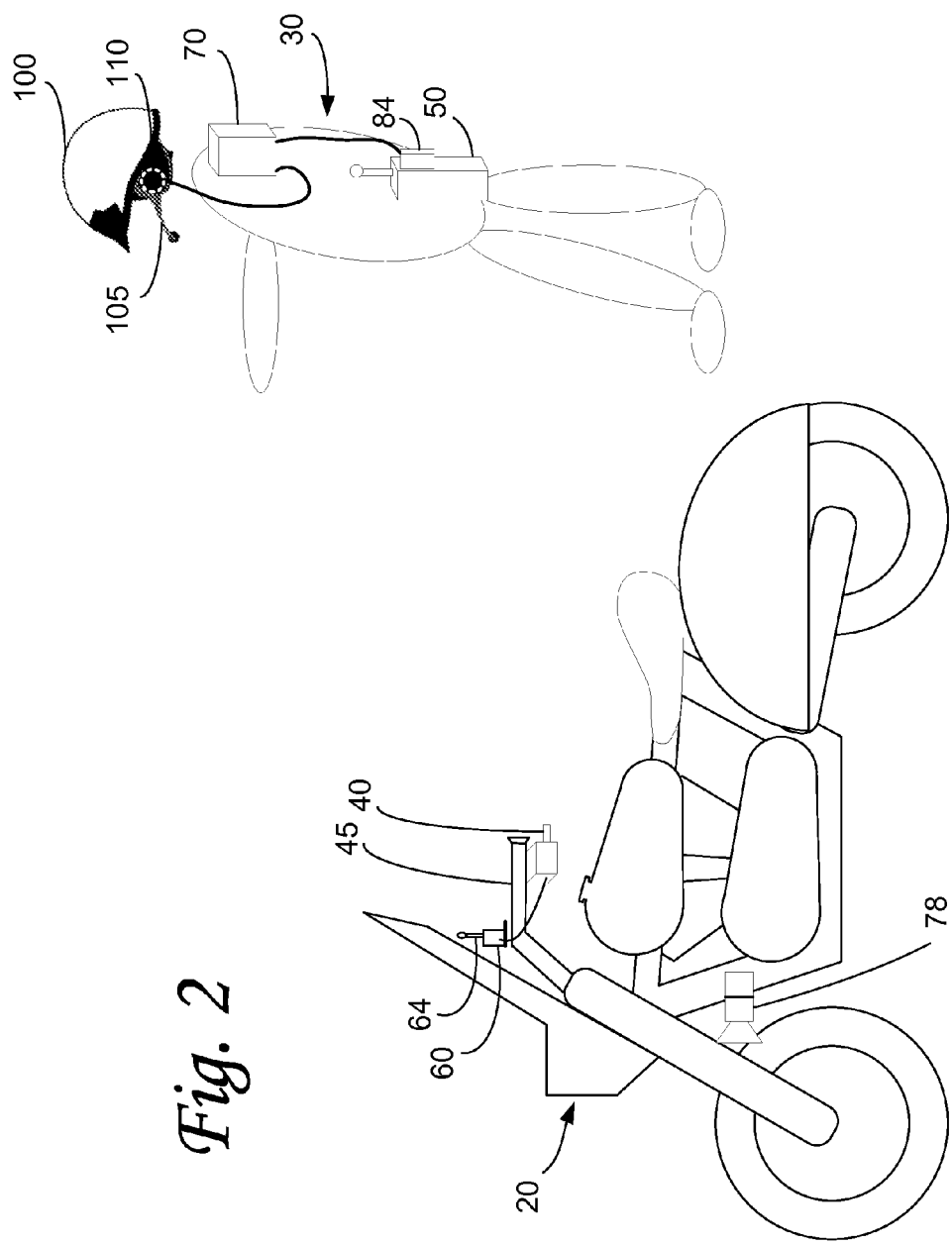
FIG. 2 is a representation of an operator off and away from the vehicle using the system.
Figure 3:
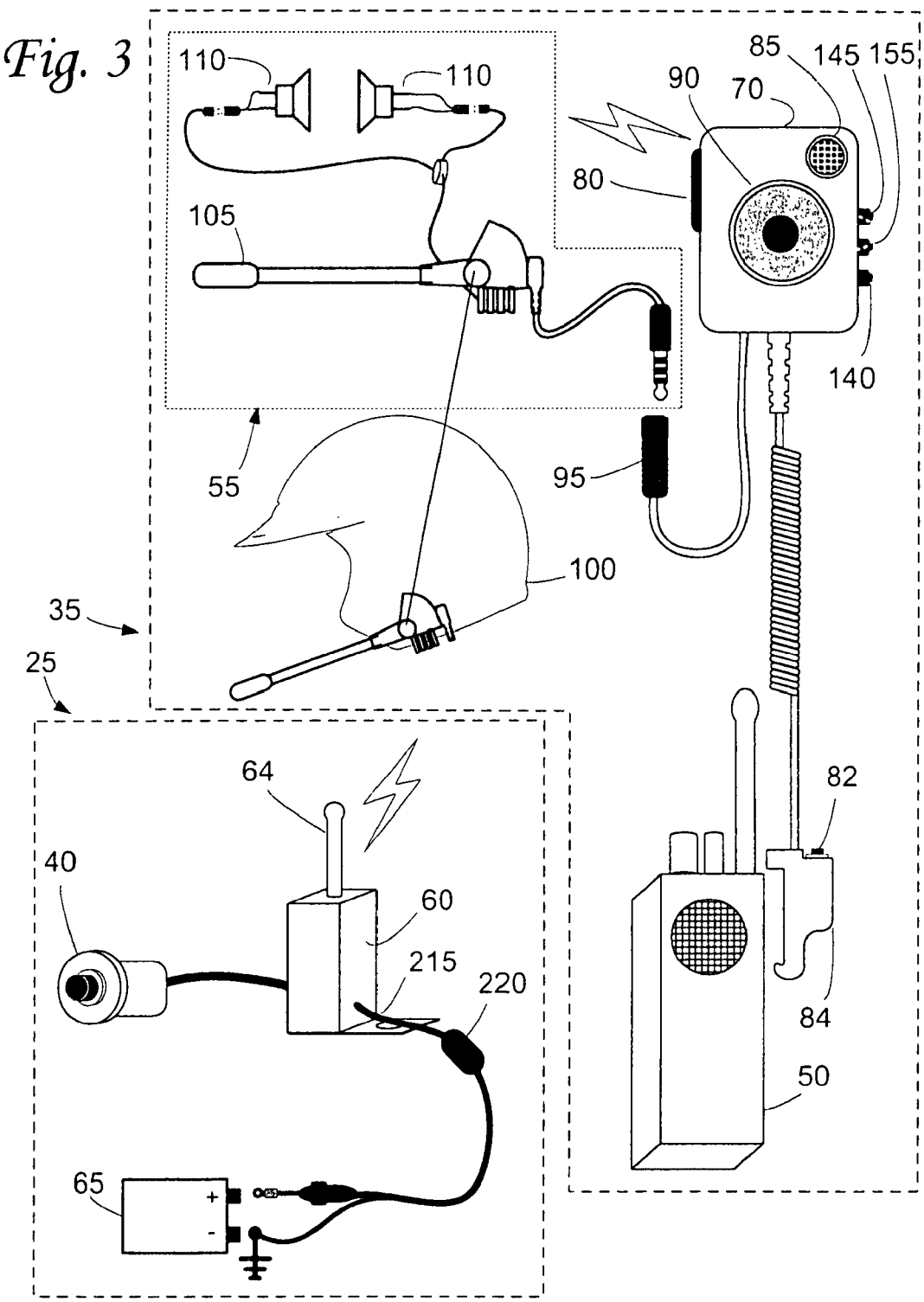
FIG. 3 is a representation of the system without it being on a vehicle and the operator.
Figure 4:
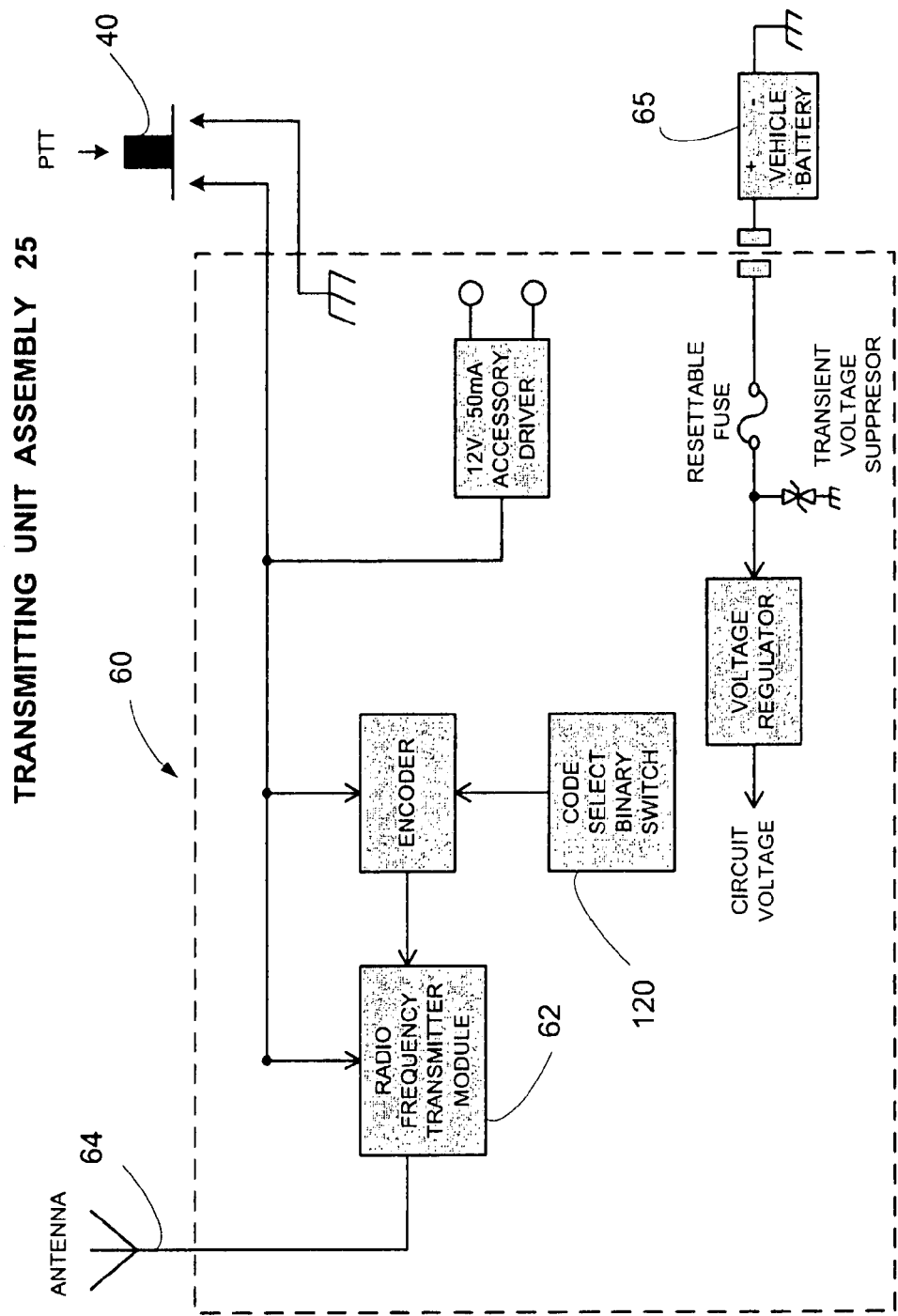
FIG. 4 is a system schematic of the transmitting unit assembly.
Figure 5:
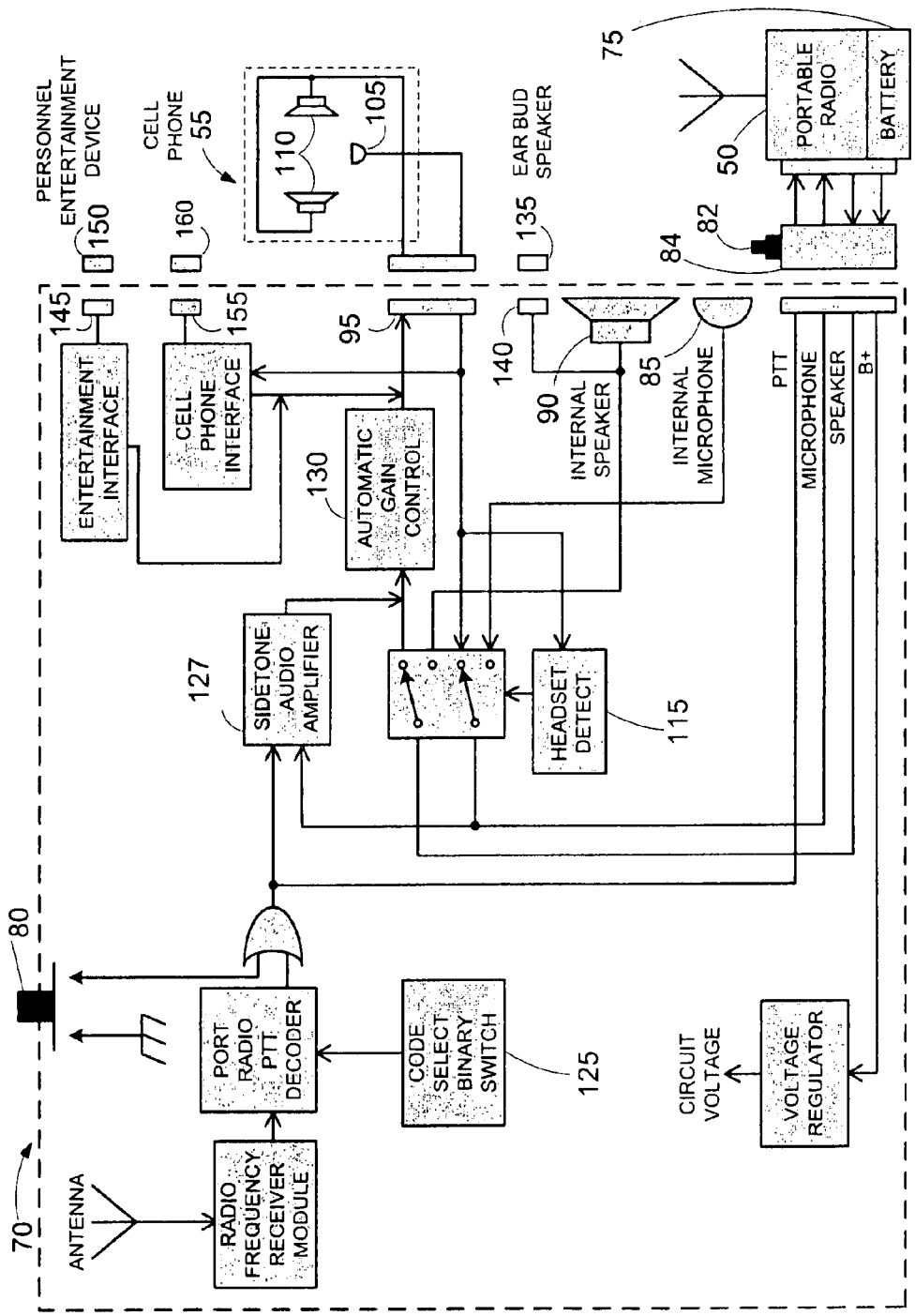
FIG. 5 is a system schematic of the receiving unit assembly.

Corresponding reference characters indicate corresponding parts throughout the several views. Unless otherwise stated, the drawings are proportional. The exemplifications set out herein illustrate exemplary embodiments of the disclosure and such exemplifications are not to be construed as limiting the scope of the disclosure in any manner.

DETAILED DESCRIPTION OF THE DRAWINGS

Before describing the present disclosure in detail, it is to be understood that the disclosure is not limited to specific solvents, materials, or device structures, as such may vary. It is also to be understood that the terminology used herein is for the purpose of describing particular embodiments only, and is not intended to be limiting.

As used in this specification and the appended claims, the singular forms "a," "an," and "the" include both singular and plural referents unless the context clearly dictates otherwise.

In the claims of this application, "portable" is intended to have its ordinary meaning of capable of being carried readily.

In the following a preferred embodiment of the disclosure is described. Numerous variations on this embodiment will naturally occur to a person of skill in the art.

FIG. 1 shows a radio system comprised of the equipment permanently affixed to the vehicle 20 (transmitting unit assembly 25) and removable equipment worn and controlled by the operator 30 (receiving unit assembly 35). The transmitting unit 25 is actuated by a push-to-talk (PTT) switch 40 on a steering bar 45. The receiving unit assembly 35 interfaces to a commercial portable radio transceiver 50 and a helmet communications kit 55.

The system allows an operator 30 to wirelessly actuate the transmit function of a commercial portable radio transceiver 50 while operating a motor vehicle 20, typically a motorcycle, snowmobile, personal watercraft, etc.

The transmitting unit assembly 25 is typically mounted to the vehicle steering bar 45 and has a mounted PTT switch 40 within convenient reach of the vehicle operator 30. The transmitting unit 60 receives power from the vehicle 20 (typically 12 volts DC) and can be on constantly on, i.e. directly attached to the vehicle battery 65, or wired through the ignition system so when the vehicle 20 is turned off, the power to the transmitter unit 60 is interrupted. When the PTT switch is pressed, a coded signal is transmitted from the radio frequency transmitter module 62 through the transmitter unit antenna 64.

The receiving unit circuitry is contained within the speaker-microphone 70 housing or other enclosure and obtains power to operate directly from the portable radio battery 75. When the receiving unit assembly 35 receives the wirelessly transmitted PTT command prompted by pressing the vehicle-mounted PTT switch 40, it invokes the transmit function of the portable radio 50 at which point the operator 30 can send voice transmissions via the portable radio 50 though a microphone element directly to a distant radio operator with whom the vehicle operator 30 is communicating. The vehicle operator 30 also has the option to press the PTT switch 80 mounted on the speaker-microphone 70 to invoke the transmit function of the portable radio 50. This allows the operator 30 to control the PTT function for the portable radio 50 when he is not within reach of the PTT switch 40 mounted on the vehicle steering bar 45. There also can be a PTT switch 82 on the portable radio adapter 84.

The speaker-microphone 70 that contains the wireless receiving unit circuitry also contains an internal microphone 85 and speaker 90 to respectively send and receive voice transmissions to and from a distant radio operator via the portable radio 50. The speaker-microphone 70 also has a multi-conductor jack 95 to directly connect an optional helmet 100 that is equipped with a boom microphone fitted 105 to the helmet 100, and self contained speaker(s) 110 so voice communications are possible while wearing the helmet 100. The boom microphone 105 and speaker(s) 110 are commonly referred to as a helmet communications kit 55.

Auto switching helmet kit detection circuitry 115 is employed within the speaker-microphone 70 to sense the connection of helmet communications kit 55 switching off the internal microphone 85 and speaker 90 within the speaker-microphone 70. This is done because field tests of the system show that operators desire the speaker-microphone's 70 internal microphone 85 and speaker 90 to be muted when the helmet communications kit 55 is connected.

The PTT command signal that is transmitted and received for the wireless PTT function is selectable from one of up to 59,049 binary code words that are configured within each transmitting assembly 25 and receiving assembly 35 pair. Each transmitting unit 25 and receiving unit 35 must be set to the same code in order for linked PTT operation to be established. The operator 30 can manually set each code within each unit 25, 35 via switches 120, 125.

When the helmet communications kit 55 is connected to the speaker-microphone 70 and the operator 30 presses the PTT switch 40 on the steering bar 45 of the vehicle 20 or the PTT switch 80 on the speaker-microphone 70, the operator 30 will hear his own voice in the helmet communications kit speakers 110. This feature is referred to as sidetone and it provides enhanced aural feedback for the operator. Hearing one's own voice when speaking is often necessary for clear communications in high noise situations. This sidetone feature only functions when the helmet communications kit 55 is connected to the speaker-microphone 70. It is controlled by the sidetone circuitry 127.

An automatic gain control circuit 130 is employed in the speaker path to the headset speakers 110, to dynamically adjust the audio level to the speakers 110 within the helmet 100 to prevent sudden and uncomfortable audio peaks.

The speaker-microphone 70 has three optional audio interfaces. First, the operator 30 can plug in an ear bud speaker 135 to the ear bud speaker port 140 and privately monitor incoming radio transmissions. When inserted into the ear bud speaker port 140 in the speaker-microphone 70, the ear bud speaker 135 would mute the speaker-microphone's speaker 90. Second, the operator 30 can plug into the personal entertainment device port 145 a device 150 such as a CD player or transistor radio that is summed with incoming radio transmissions. Third, the operator 30 can plug into the cellular telephone port 155 a cellular telephone 160 that is summed with incoming radio transmissions, and outbound cellular telephone conversation can be accomplished through the headset microphone 105.

Exemplary frequencies for operation of this system include, for example, the 902 to 928 MHz frequency range, the 2.4 GHz frequency band (as used, for example, by the Bluetooth communications standards), and the 5.8 GHz frequency band. In addition, near field magnetic induction may be used as an alternative way of communicating information in the disclosure.

Advanced circuit board design and layout techniques may be employed on both the transmitting unit assembly 25 and receiving unit assembly 35 to minimize high energy electromagnetic interference (EMI) influences from nearby radio frequency transmitters. The attached commercial portable radio transceiver 50 connected to the receiving unit assembly 35 is the nearest source of high energy radio frequency and often has a rated radio frequency (RF) output power level of 5 watts or more. High gain antennas are often available for commercial portable radio transceivers as an option that can increase the effective radiated power beyond 5 watts. This effective gain in power can cause significant degradation in performance of the receiving unit assembly 35 unless appropriate design techniques are used.

It may be preferred that the transmitting unit assembly 25 and receiving unit assembly 35 be enclosed in a waterproof or water-resistant enclosure on account of the possibility of rain. Preferably the enclosure is one which is compliant with the International Electrotechnical Commission 60529 IPX7 standard. That standard specifies that a unit shall not have significant water incursion if it is taken to a depth of 1 meter and held there for 30 minutes or less.

It may also be preferred that circuit boards in the system be conformally coated with silicone in order to provide protection from water. This protection may be in lieu of or in addition to a waterproof or water-resistant enclosure.

Figure 6:
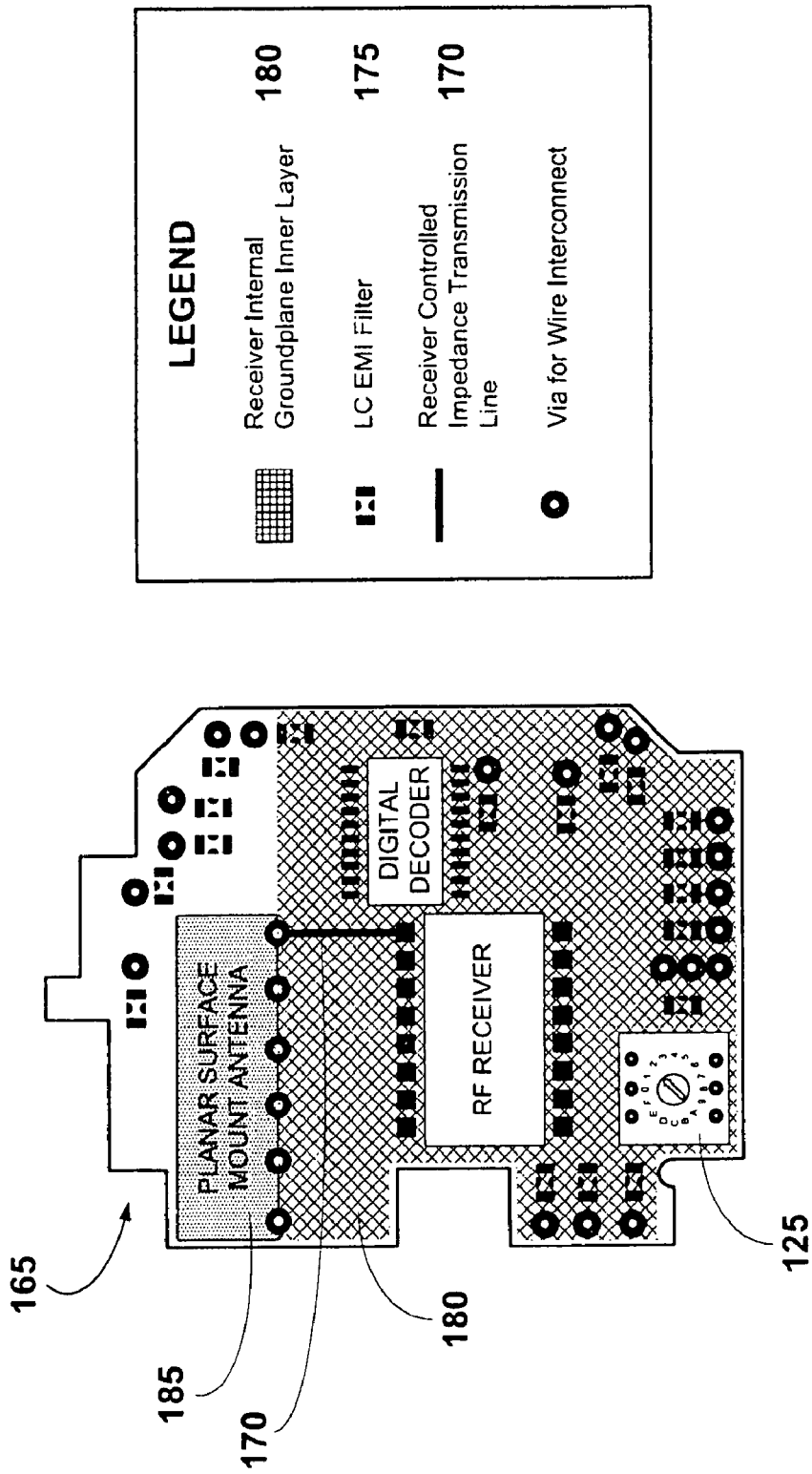
FIG. 6 is a diagram of the receiver PCB board layout.

FIG. 6 illustrates the main component layout of the receiver PCB board 165. For the receiver PCB board 165, specialized microwave circuit board layout techniques were employed using a controlled impedance transmission line 170 for the RF circuitry. As a matter of good design practice, multilayer ceramic bypass capacitors that are more effective for high frequencies are placed throughout the receiver board 165. In addition, LC EMI filters 175 were used throughout the receiver board 165 in order to inductively and capacitively bypass radio frequency interference to the internal ground plane 180. Special attention was given to the internal ground plane layer 180 to maintain maximum area with minimal discontinuance particularly under RF sensitive components. In addition, a tuned planar surface mount antenna 185 was placed internally in the speaker-mic enclosure 70 for better operator ergonomics and ease of manufacturability.

Figure 7:
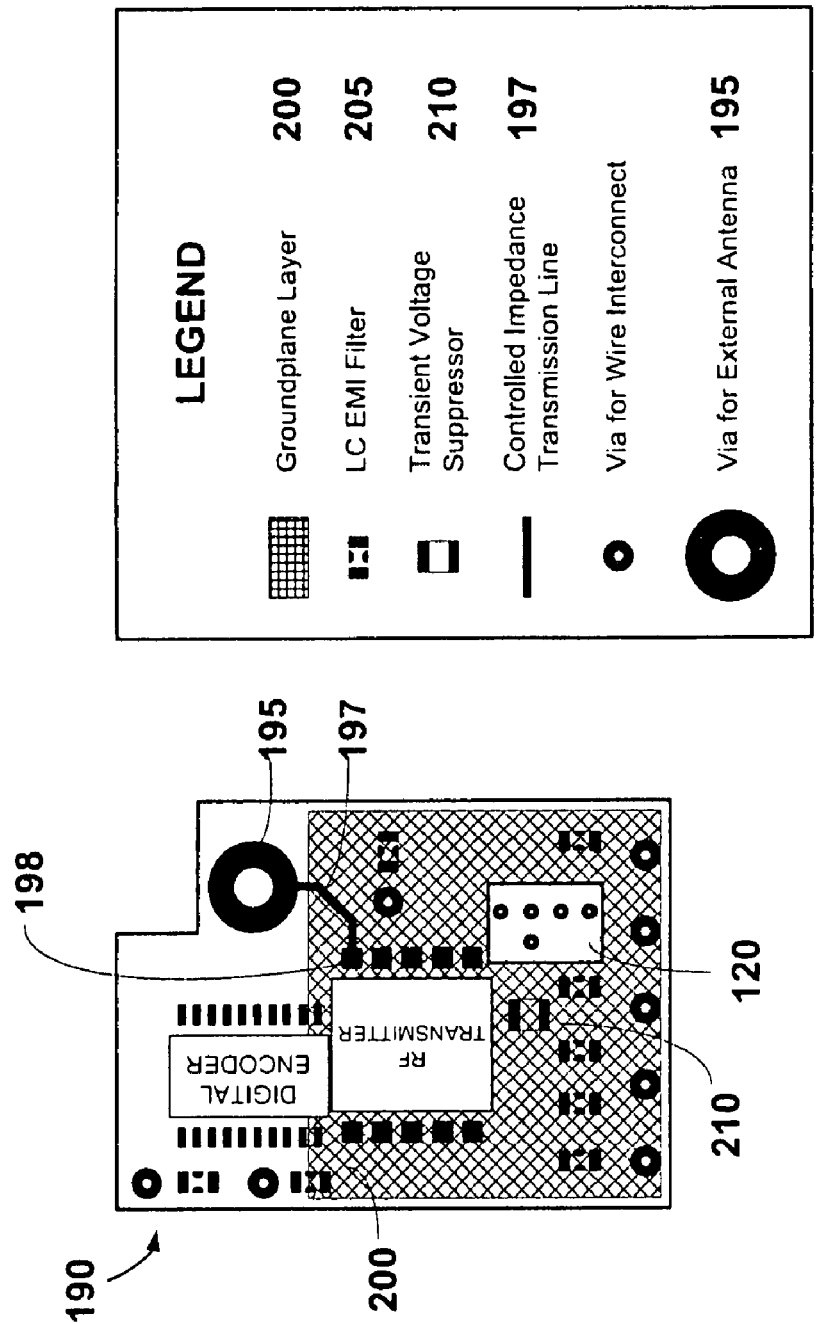
FIG. 7 is a diagram of the transmitter PCB board layout.

FIG. 7 illustrates the main component layout of the transmitter PBC board 190. For the transmitter PCB board 190, a tuned external antenna 64 is used to achieve the best range of the transmitted signal. The antenna 64 is external and connected to the transmitter PCB board 190 using the via for the external antenna 195. A controlled impedance transmission line 197 couples the RF transmitter output port 198 to the external antenna 64, and in combination with the underlying ground plane 200, ensures that maximum radiated power to the antenna 64 is delivered with minimum signal reflections.

The transmitting unit enclosure 60 is conductively shielded and is electrically connected to the transmitter PCB board ground plane 200 which effectively shields the internal circuitry from high energy RF interference. Similar to the receiver PCB board 165, the transmitter PCB board 190 employs multilayer ceramic bypass capacitors for more effective use with high frequencies and LC EMI filters 205 in order to inductively and capacitively bypass radio frequency interference to the underlying ground plane 200.

The DC power entering the transmitting unit 60 is protected from harmful transient voltage spikes, which can be present on the vehicle battery 65 supply, by employing a bi-directional transient voltage suppressor diode 210. These transient spikes can be generated by faulty charging systems or high amperage accessories that superimpose counter EMF (electromotive force) currents upon the vehicle's power system.

The transmitter DC power cable 215 sourcing power from the vehicle battery 65 has a clamp-on ferrite choke 220 with an optimized permeability suited for VHF and UHF radio frequency bands typically employed by the operator's 30 portable radio 50. The purpose of this choke 220 is to significantly reduce or eliminate any high energy radio frequency interference radiating from the operator's 30 portable radio transceiver 50 from entering the shielded enclosure of the transmitting unit 60 through the cable 215 and affecting the sensitive circuitry on the transmitter PBC board 190.

Operation

On/In Vehicle

While operating the vehicle 20, the operator 30 receives from and transmits to the portable radio 50. Keying the portable radio 50 is accomplished by pressing the PTT switch 40 mounted on the steering bar 45 of the vehicle 20. Once the PTT switch 40 is pressed, the operator 30 speaks into the headset microphone 105. When speaking, the operator 30 hears sidetone through the headset speaker(s) 110. The operator's speech is transmitted to the portable radio 50.

While the PTT switch 40 is pressed, the transmitting unit 60 transmits the PTT command signal continuously from the radio frequency transmitter module 62 through the transmitter unit antenna 64. The receiving unit assembly 35 receives the wirelessly transmitted PTT command signal and decodes the PTT command signal. If more than a first predetermined number of identical and correct PTT command signals are received by the receiving unit assembly 35 within a first predetermined time interval, the receiving unit assembly 35 invokes the transmit function of the portable radio 50. If a second predetermined number of identical and correct PTT command signals are not received within a second predetermined time interval, the receiving unit assembly 35 deactivates the transmit function of the portable radio 50.

When the operator 30 is not transmitting, inbound transmissions from the portable radio 50 are heard by the operator 30 through the headset speaker(s) 110.

Out/Off of Vehicle

When the operator 30 exits the vehicle 20, the operator 30 will continue to hear inbound transmissions from the portable radio 50.

When pressing the speaker-microphone PTT button 80 and the helmet communications kit 55 is connected to the speaker-microphone 70, the operator 30 speaks into the headset microphone 105 and the operator's speech is transmitted through the portable radio 50. When transmitting, the operator 30 hears sidetone through the speaker(s) 110. When not transmitting and the helmet communications kit 55 is connected to the speaker-microphone 70, all transmissions received by the portable radio 50 are heard through the headset speaker(s) 110 and the speaker 90 in the speaker-microphone 70 is muted. This is called the auto-mute function.

When the helmet communications kit 55 is not connected to the speaker-microphone 70, the speaker-microphone auto-mute function is turned off and transmissions from the portable radio 50 are broadcast through the speaker-microphone's speaker 90. When the helmet communications kit 55 is not connected to the speaker-microphone 70 and the operator 30 pushes the PTT button 80 on the speaker-microphone 70, the operator 30 speaks into the speaker-microphone's microphone 85. The operator's speech is transmitted through the portable radio 50.

Maintenance

No regular maintenance of the system is required. The system may run off of the vehicle battery 65 and the portable radio battery 75 so there is no requirement to charge an internal battery in the speaker-microphone 70 from an external power source in order to power the receiving unit assembly 35.

Code Selection

In order to prevent operators of different vehicles from interfering with each other, each system can be set to different operating codes. This ability to have different codes allows for numerous operators to use their communications devices in close proximity without any interference. The code selection is made by selecting a particular code on a switch. The transmitting unit assembly code selection switch 120 and the receiving unit assembly code selection switch 125 both must be set to the same code setting in order for the system to operate properly.

Accessories

Attaching an ear bud speaker 135 simply requires plugging in the ear bud speaker 135 to the ear bud speaker port 140 on the speaker-microphone 70. This mutes the speaker-microphone speaker 90. The same procedure is used to connect a cellular telephone 160 or personal entertainment device 150 to the system except that they would be plugged into the cellular telephone port 155 and entertainment audio port 145, respectively.

Alternative Embodiments

Alternative embodiments of the disclosure are described here.

Portable Radio Only with Public Address System Interface. Similar system as described above except that there is a wireless interface to a public address (PA) system 78 mounted on the vehicle. Operator would be able to wirelessly use the PA system 78 up to 1,500 feet from the vehicle. Either transceivers would have to be put into the transmitting unit assembly 25 and the receiving unit assembly 35 or a receiver would have to be put into the transmitting unit assembly 25 and a transmitter would have to be put into the receiving unit assembly 35 in order to make this alternative embodiment functional.

Automatic Code Selection. Instead of having to manually select the code, the system would automatically select a code from which to work in order to avoid interference with other systems being used within the wireless range of the system. The system may for example listen to the codes being used within the wireless range and transmit only using a code not used within the wireless range. The code not used within the wireless range may for example be communicated by the vehicle-mounted component wirelessly to the portable component in a special format.

Automatic Volume Control System which Adjusts Speaker Volume Levels Depending on Vehicle Speed. Because of wind and engine noise, which both typically increase with higher vehicle speed, this additional part of the system would increase or decrease the volume of the helmet communication kit speaker(s) 110 depending on the speed of the vehicle.

Latency masking There is the possibility that more powerful radio emissions from other radios in the immediate area or other transmitters broadcasting other codes could interfere with the receiver receiving the code sent by its respective transmitter. This can lead to a fluttering of the function being controlled by the code transmissions as the receiver intermittently receives the code.

In order to avoid such fluttering, a delay may be inserted in the shut off of the PTT function so that when the PTT is engaged on the speaker-microphone, it is not immediately shut off when the proper code is not received. Instead a slight delay (for example, 300-350 milliseconds) occurs and the PTT function is kept on. This allows for the code from the transmitter to continue to be sent to the receiver and for the receiver to reacquire the two out of three codes which will continue to keep the PTT function on. Thus if the code is not properly received for a few milliseconds, the user can be expected not to notice because the latency masks the fact that the code was not continuously acquired.

In the embodiment just described, if the PTT button on the handlebar has been released, then there may be a modest delay in the amount of time that it takes for the PTT function to shut off. Commonly the delay will be such that users will not notice it.

It is to be understood that while the disclosure has been described in conjunction with the preferred specific embodiments thereof, the foregoing description is intended to illustrate and not limit the scope of the disclosure. Other aspects, advantages, and modifications within the scope of the disclosure will be apparent to those skilled in the art to which the disclosure pertains.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

What is claimed is:

1. A communications system for a vehicle user, comprising:
a first portable transceiver capable of being carried on a vehicle user's person;
a second portable transceiver, capable of being carried on a vehicle user's person;
a vehicle-mounted transceiver, supported by a vehicle, wherein the vehicle-mounted transceiver is capable of communicating with the first portable transceiver, wherein coded information contained in a transmission from the vehicle-mounted transceiver may be received by the first portable transceiver and thus activates a push to talk function of the second portable transceiver; and
a vehicle-mounted public address system in communication with the vehicle-mounted transceiver, wherein the user provides sound to the first portable transceiver, the first portable transceiver converts the sound to first signals and transmits the first signals to the vehicle-mounted transceiver, wherein the vehicle-mounted transceiver receives the first signals from the first portable transceiver and transmits the first signals to the vehicle-mounted public address system, wherein the vehicle-mounted public address system converts the first signals to sounds, wherein the first signals represent at least audio received from the vehicle user by the first portable transceiver.

2. The communications system of claim 1, further comprising at least one of a helmet-mounted speaker and a helmet-mounted microphone capable of being carried on a vehicle user's person.

3. The communications system of claim 1, further comprising a lapel speaker-microphone capable of being carried on a vehicle user's person.

4. The communications system of claim 1, wherein the coded information is modulated onto the transmission from the vehicle-mounted transceiver using one or more of amplitude modulation, frequency modulation, and phase modulation.

5. The communications system of claim 1, wherein the second portable transceiver is capable of transmitting over a public safety radio system and receiving information transmitted by other transmitters over the public safety radio system.

6. The communications system of claim 1, wherein the communication from the vehicle-mounted transceiver to and from the first portable transceiver takes place over the frequency range of about 902 MHz to about 928 MHz.

7. The communications system of claim 1, wherein the communication from the vehicle-mounted transceiver to and from the first portable transceiver takes place in a 2.4 GHz frequency band.

8. The communications system of claim 1, wherein the communication from the vehicle-mounted transceiver to and from the first portable transceiver takes place in conformance with Bluetooth standards.

9. The communications system of claim 1, wherein the communication from the vehicle-mounted transceiver to and from the first portable transceiver takes place in a 5.8 GHz frequency band.

10. The communications system of claim 1, wherein the first portable transceiver and the second the portable transceiver receive electricity from a single battery.

11. The communications system of claim 1, wherein communication between the vehicle-mounted transceiver and first portable transceiver takes place reliably in the presence of the second portable transceiver having a radio-frequency output of at least about 5 watts.

12. The communications system of claim 11, wherein communication takes place reliably in the presence of a second portable transceiver having a radio-frequency output of at least about 5 watts and a high-gain antenna.

13. The communications system of claim 1, wherein the first portable transceiver is enclosed by a water-resistant enclosure.

14. The communications system of claim 13, wherein the enclosure causes the first portable transceiver to comply with the International Electrotechnical Commission 60529 IPX7 standard.

15. A method of activating and deactivating a vehicle-mounted public address system, comprising:

provide a portable transceiver, capable of being carried on a vehicle user's person;

providing a second portable transceiver system, capable of being carried on a vehicle user's person;

providing a vehicle-mounted transceiver in communication with a vehicle-mounted public address system;

providing sound to the first portable transceiver, wherein the first portable transceiver generates first signals based at least in part on the sound and transmits the first signals to the vehicle-mounted transceiver; and receiving, by the vehicle-mounted transceiver, the first signals from the first portable transceiver system, transmitting the first signals to the vehicle-mounted public address system, wherein the vehicle-mounted public address system converts the first signals to sounds, and wherein the first signals represent at least audio received from the vehicle user by the first portable transceiver.

16. The method of claim 15, wherein coded information contained in a transmission from the vehicle-mounted transceiver may be received by the first portable transceiver and thus activates a push to talk function of the second portable transceiver.

* * * * *